Dec. 30, 1958　　　　　H. FEICHTINGER　　　　　2,866,691
APPARATUS FOR GAS ANALYSIS
Filed Aug. 22, 1955　　　　　　　　　　　　　2 Sheets-Sheet 1
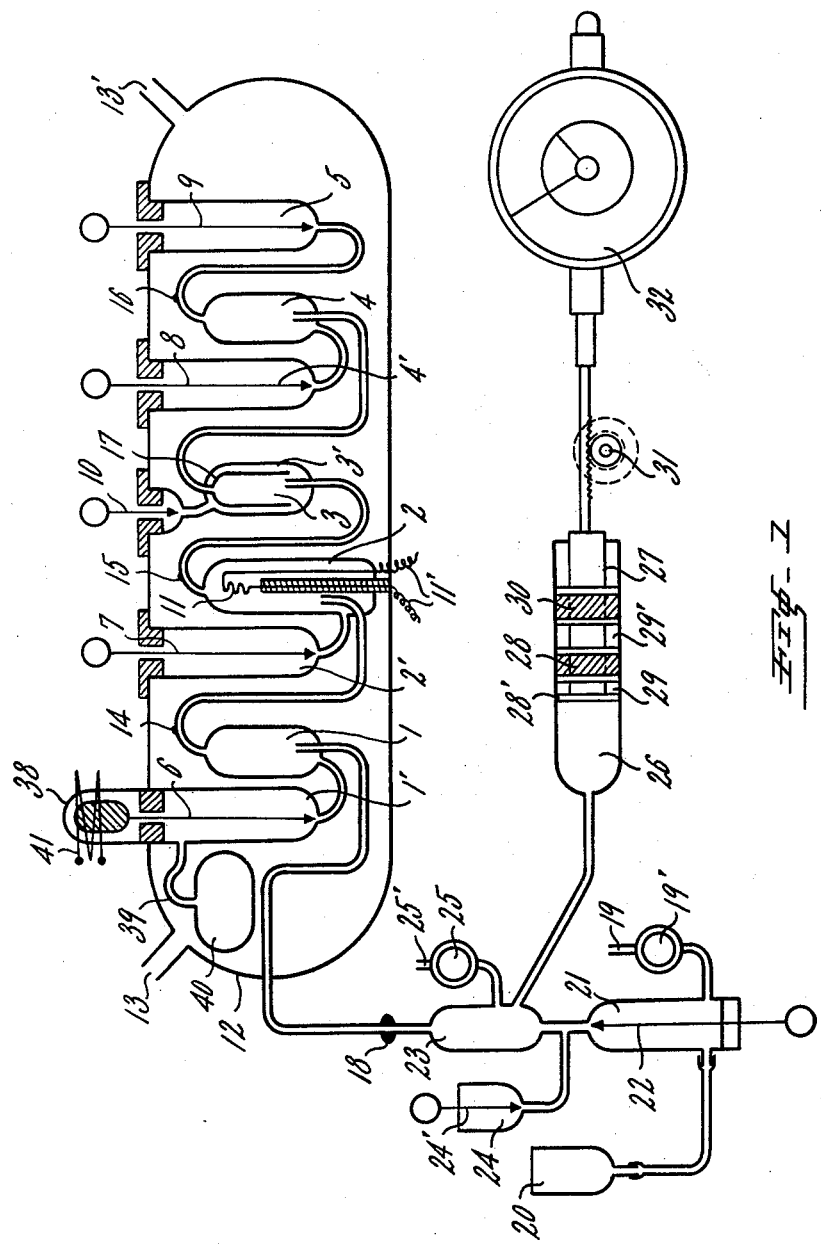
INVENTOR.
HEINRICH FEICHTINGER
BY

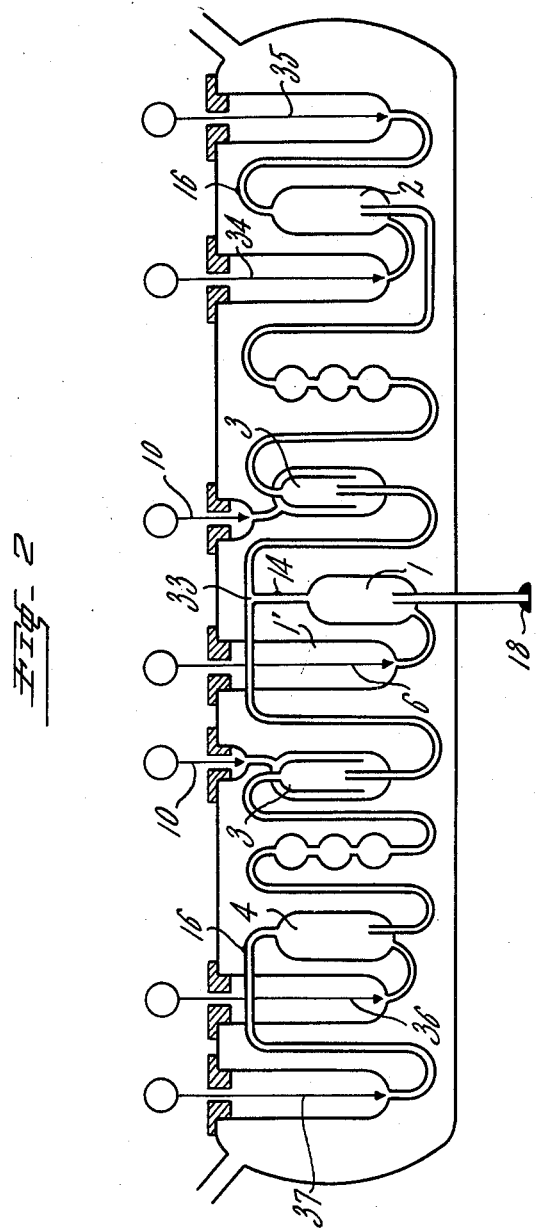

United States Patent Office 2,866,691
Patented Dec. 30, 1958

2,866,691

APPARATUS FOR GAS ANALYSIS

Heinrich Feichtinger, Geneva, Switzerland, assignor to Geraetebau-Anstalt, Balzers, Liechtenstein, a firm Application August 22, 1955, Serial No. 529,735

Claims priority, application Germany August 21, 1954

6 Claims. (Cl. 23—254)

This invention relates to gas analysis, and in particular to methods of and apparatus for performing gas analyses.

It is an object of the present invention to provide means facilitating analysis of minute samples of gases with a high degree of precision and in a manner involving the least expenditure of time possible.

It is another object of the present invention to provide means contributing to rapid and accurate gas analysis procedures both for determining absolute quantities of the components of said gas being analyzed and for determining the relative proportions of said components in the total volume of said gas.

Still another object of the present invention is the provision of means affording a compact and greatly simplified gas analysis apparatus in which a plurality of analyzing or measuring stages or zones are provided, said apparatus being designed to permit measurement of the volume of the gas in the various stages by the same means which effect movement of the gas from one stage to another.

It is a further object of the present invention to provide means contributing to novel and highly efficient gas analysis apparatus having a plurality of measuring or reaction stages or zones connected in series in such a manner that the gases to be analyzed may flow from zone to zone without encountering any valves, cocks or like conduit obstructing means, whereby the creation of dead spaces or pockets tending to cause losses of portions of the gases during the analysis is completely avoided.

It is also an object of the present invention to provide means conducive to unitary multi-stage gas analysis apparatus in which liquids, substantially inert with respect to the gases being analyzed, are employed to propel the gases through the analysis stage system of the apparatus, the amount of liquid needed to move the gases past prearranged index marks associated with each stage being measured to indicate the quantity of gas being moved through the system.

Yet a further object of the present invention is the provision of means enabling division of a gas sample to be analyzed into a plurality of portions and which may be led, respectively, without the intermediary of any valves or like structures into a corresponding plurality of gas analysis systems maintained under identical conditions of temperature and pressure, whereby all of the components of the gas may be determined through continuous and substantially simultaneous analysis procedures.

More particularly, there are known procedures for gas analyses in which the gas to be analyzed is caused to react with a number of absorption or other anlysis materials in a series of steps in such a manner that the components of the gas can be determined from the volumes thereof which disappear during each step. Such gas is repeatedly investigated in a single reaction chamber which, in accordance with the analysis procedure, is sequentially filled with the different reagents or analysis materials.

Due to the introduction of these materials and due to the periodic washing of the reaction chamber required after each such introduction, however, there remain in the chamber gases or other substances which often give rise to not inconsiderable errors of measurement, so that precision analyses, especially of small volumes of gases, cannot be carried out.

It is further known, in microanalyses of gases, to measure the gas volume in graduated capillary tubes, whereby, however, errors in measurement also arise. It has also been proposed to lead the gas to be analyzed through several sequentially arranged reaction chambers. However, since such reaction chambers are separated from one another by means of valves or cocks there are always present a number of dead spaces or pockets in which small portions of the gas are trapped. This also makes measurements erroneous especially when the volume of the gas to be analyzed is very small.

The principal object of the invention is, therefore, to provide an analysis process and apparatus which make it possible to carry out gas analyses of small volumes of gases with the greatest precision and in the least amount of time possible. This object is attained, in accordance with the invention, by virtue of the fact that a sample of the gas to be analyzed is forced through a plurality of serially connected measuring and reaction zones or stages by means of a suitable transporting or displacement liquid, whereby the quantity of gas passing through each zone may be indirectly determined by measuring of the amount of said transporting liquid necessary to move said quantity of gas past a suitable index mark.

The gas sample thus unidirectionally traverses a series of analysis stages and is measured as it passes index marks provided in each of the stages. Dead spaces or pockets, as well as undetected gas remainders, are therefore completely avoided. Displacement of the gas sample to be analyzed, consequently, is effected solely through the hydrostatic pressure of the transporting or displacement liquid or of the absorption solution, if the latter be used.

By way of example, mercury, oil or some other suitable liquid may be employed as the displacement liquid. It is also possible to employ displacement liquids which simultaneously dry the gas or effect absorption of one or more of the gas components. Again by way of example, a caustic potash solution may be employed which absorbs carbon dioxide from the gas sample but does not react with the remaining components thereof.

To carry out the process according to the invention there is provided a preferred apparatus which consists of an antechamber or preliminary measuring chamber and several reaction chambers connected in series therewith. The reaction chambers are directly connected with each other by capillary conduits provided with index marks and are filled by either the transporting liquid, the reaction liquid or a suitable isolation liquid which prevents intermixture of the reagents in the chambers.

Each of these chambers communicates with a pressure equalizing chamber which may be vented or closed to the outside by means of a valve. Moreover, preceding the antechamber there is provided a supply container for the transporting liquid which is so constructed that exactly measured quantities of the liquid for displacing the gas in the chamber system may be dispensed therefrom.

The control of the volume of the gas sample within the measuring and reaction stages is effected by means of selective operation of suitable valves in the pressure equalizing chamber which may be vented or closed. The entire arrangement enables the gas sample to be moved along its path without passing any locks or gating devices.

These and other objects and advantages of the invention will become further apparent from the following detailed description, reference being made to the accompanying drawings, showing preferred embodiments of the invention.

In the drawings:

Fig. 1 is a schematic illustration of a first embodiment of a gas analysis apparatus constructed in accordance with the present invention, and Fig. 2 is a schematic illustration of a second embodiment of a gas analysis apparatus according to the present invention.

Referring now to Fig. 1, the apparatus there shown may be used, for example, for analysis of gas mixtures including $CO_2$, $CO$, $H_2$ and $N_2$. The apparatus specifically includes a preliminary measuring chamber 1 and reaction chambers 2 and 4, which are in communication, respectively, with pressure equalizing chambers 1', 2' and 4', the latter being controlled, respectively, by valves 6, 7 and 8. In the reaction chamber 2, a heater or ignition coil 11 is provided, suitable leads 11' enabling current to be supplied to said coil.

Between the reaction chambers 2 and 4 there is connected a separating or isolating chamber 3 which is provided with an exhaust valve or vent 10 and with a bell 17 in its interior. The lower portion of chamber 3 is filled, both interiorly of bell 17 and in the annular space 3' surrounding said bell, with a liquid, such as paraffin oil or silicon oil, for preventing intermixture of the respective liquids in the two chambers 2 and 4. Thus, the isolating liquid prevents movement of ions from one reaction chamber to the other.

Communicating with the outflow portion of the chamber 4 is a gas exhaust chamber 5 which is vented to or closed from the outside atmosphere by means of a valve 9. All of the chambers 1 to 5 are surrounded by a jacket 12 provided with inlet and outlet openings 13 and 13' through which a suitable thermol control liquid is circulated to maintain the chambers at uniform temperature conditions. Additionally, the jacket provides a sufficiently rigid mounting for the various chambers of the apparatus.

Connected to the preliminary measuring chamber 1 by means of a conduit 18 is a gas collecting chamber 23. A gas supply chamber 21, provided with a valve 22, is connected to the collecting chamber 23, the chamber 21, being, on the one hand, connected to a liquid level control container 20 and, on the other hand, to a gas supply conduit 19 via a valve 19'.

Also connected with the collecting chamber 23 by means of a valve 24' is a container 24 by means of which absorption substances or suitable isolating solutions may be introduced into the chamber 23. A conduit 25', controlled by a valve 25, is also connected to the chamber 23 to enable special reaction gases, such as oxygen, to be fed thereto.

A supply chamber 26 for the transporting or displacement liquid is also connected to the collecting chamber 23. The chamber 26 is constructed in the form of a pressure cylinder having a reciprocally movable piston 27 which is connected to a high precision dial micrometer gauge 32 for measuring the displacement of the piston and thus of the liquid. The piston is displaced by a suitable gear and rack drive 31 or the like.

The piston 27 is preferably provided with a plurality of sealing or packing collars 28, 28' and 30, the spaces 29 and 29' between said collars being filled with a suitable lubricating material. The main sealing action is effected by the collar 28, while the collar 30 prevents escape of the lubricating material to the outside rearwardly of the piston.

Thus it will be seen that the collar 28 is surrounded by lubricating material at both its front and rear faces so that it is lubricated equally during forward and rearward movement with the piston, the lubricating material simultaneously acting as a sealing material.

When the piston is moved forwardly (to the left in Fig. 1), a thin film of the lubricating material moves between the wall of the cylinder 26 and the outer surface of the packing collar 28 from the space 29 to the space 29'. Upon reverse movement of the piston a similar quantity of the lubricating material moves in the opposite direction. In this manner it is ensured that the piston moves smoothly so as to displace exact quantities of the liquid both during forward and reverse movement which quantities can be measured by the gauge 32.

The use of the above described apparatus and the gas analysis procedure according to the present invention may be best illustrated by the following description of an actual analysis of a gas mixture containing $CO$, $H_2$ and $N_2$.

At the outset, container 20 and the chambers 26, 21, 23, 1, 1', 2 and 2' and their connecting conduits are filled, respectively, with mercury serving as the displacement liquid. The lower half of isolating chamber 3 is filled with an isolating liquid such as paraffin oil, while the upper half of chamber 3 and all of chambers 4, 4' and 5 are filled with a caustic potash solution, KOH, serving as a reagent liquid. The various valves are closed.

The valve or cock 19' is now opened, and upon lowering of the level control container 20 the gas mixture to be analyzed is drawn into the gas supply chamber 21. Thereafter the valve 19' is closed, valve 22 opened, and by means of a rearward movement of the piston 27 (to the right in Fig. 1) a gas sample measured by dial micrometer gauge 32 is drawn into the gas collecting chamber 23.

At this time the valve 22 is closed and the valve 6 opened, and the gas is then forced by the mercury from chamber 26 into the preliminary measuring chamber 1 through forward movement of the piston 27. The piston 27 is moved further in such a manner as to equalize the levels of the liquid mercury in the chambers 1 and 1', whereby the gas sample in the chamber 1 will be subjected to the pressure existing in the chamber 1'.

The valve 7 is now opened very slightly for short periods of time to permit the bubble of the gas sample to be forced into the capillary tube between the chambers 1 and 2 up to the index mark 14. At this point the gauge 32 is read very accurately or zeroized.

It might here be noted that to the extent that the upper portions of the pressure equalizing chambers 1', 2' and 4' are in communication with the outside atmosphere, the pressure on the gas sample will be equalized with atmospheric pressure. However, should the upper portions of the pressure equalizing chambers be sealed from the atmosphere, as by means of cap 38 shown only on chamber 1' for the sake of clarity, then the pressure on the gas sample is equalized through a conduit 39 with the pressure existing in a gas filled counterpressure vessel 40 connected to said conduit. In the latter case, the valve 6, for example, may be actuated by a solenoid or like electromagnetic means 41.

Sealing of the pressure equalizing chambers from the atmosphere is, however, necessary only when measurements of absolute gas volumes are to be taken, which must be independent of ambient pressure and temperature conditions. In most instances, where the problem is only the determination of percentages of various gases in a mixture, the counterpressure container 40 and the sealing of the equalizing chambers from the atmosphere may be dispensed with, so that the upper portions of all of the equalizing chambers communicate with the atmosphere in the manner of chamber 2', for example.

Returning now to the actual analysis, as soon as the gas sample is brought to the desired pressure in chamber 1 and the gauge 32 has been read or zeroized, the valve 6 is closed and the valve 7 opened. Thereafter, the piston 27 is carefully advanced to push the gas sample from the chamber 1 past the index mark 14 and to the chamber 2 until the mercury, which pushes the gas ahead of it, reaches said index mark 14. The gauge is now read again very exactly.

In this manner, the original volume of the gas sample is indirectly determined by measuring of the amount of liquid needed to move the gas bubble entirely past the index mark 14. If the gauge was previously zeroized, the new reading is the desired value. If not, then the new reading must be subtracted from the previous reading to get the volume of the gas sample.

Oxygen is now drawn into chamber 23 through valve 25, and an accurately measured quantity thereof is conducted to the chamber 2 in the same manner as described above with respect to the gas sample.

When both the gas sample and the oxygen are completely contained in the chamber 2, the combustible component of the sample, i. e., CO, is burned due to the passage of an electric current through the heater or ignition coil 11 arranged in the chamber 2. The valve 7 is opened and piston 27 actuated to equalize the mercury levels in chambers 2 and 2′, and concurrently the remaining quantity of gas is brought up to the index mark 15 through opening of the valve 8. During these operations, the measurement of the remaining gas volume is effected in the same manner as the measurement in the first stage.

The gas remaining is now transferred into the last reaction chamber 4 through the isolating chamber 3, coming into contact with the KOH contained in both said chambers. KOH has the property of absorbing $CO_2$, the latter resulting from the combustion of the CO in chamber 2. The transfer is effected in the same manner as set forth above, i. e., by manipulation of valve 8 and piston 27, readings being taken on gauge 32 at all times. Thus, the remaining gas quantity is measured by means of the index mark 16. When all readings have been taken, the remaining portion of the gas sample is expelled through the chamber 5 past valve 9.

The calculations as to the percentages of the gas sample components may now be made from the originally introduced quantity of gas, which was measured as it passed the index mark 14, the contraction due to combustion, which was measured by the passage of the gas sample past the index mark 15, and the $CO_2$ absorption which was measured by the passage of the remainder of the sample past the index mark 16. To the extent that gas in the chamber 2 is not burned, passage of the gas past mark 16 permits the absolute $CO_2$ content of the gas to be analyzed to be determined.

By means of a procedure as described above, it will be readily realized, it is possible to use the displacement of the gas sample for purposes of measuring the volume of said sample, whereby the time expended for the entire analysis is greatly reduced. Since throughout the entire path of flow of the gas sample through the analysis apparatus no valves or similar elements which might cause errors in measurement are employed, very exact results can be attained even when only small quantities of gas, for example, approximately 0.1 cm.$^3$ and less, are available for analysis.

When it is desired to carry out somewhat less precise gas analyses, the displacement of the gas sample may be effected by means of the movable liquid level control container 20 in lieu of the piston 27 and dial gauge 32. The operation is then as follows:

The quantity of gas drawn into the supply chamber 21 through the valve 19′ is transferred to the preliminary measuring chamber 1 through raising of the container 20, i. e., increasing the hydrostatic pressure on the mercury, with valves 22 and 6 open. By means of slight venting of the valve 7, the gas is permitted to move in the capillary tube between the chambers 1 and 2 up to the index mark 14. With valve 6 open the container 20 is now raised or lowered until the mercury levels in chambers 1 and 1′ are equalized, the container 20 having suitable calibrations (not shown) associated therewith for this purpose.

The valve 6 is now closed and the valve 7 opened, and through raising of the container 20 the gas is forced from the chamber 1 through the capillary tube into the chamber 2 until the mercury following and pushing the gas bubble reaches the index mark 14. The valve 22 is now closed again and the new liquid level read on the scale or graduations associated with the container 20.

In this case, too, the transferred quantity of gas corresponds to the displaced quantity of displacement or transporting liquid, which is easily determined from the difference between the two liquid level readings of the container 20. Transfer of the gas sample to the remaining reaction stages or zones is effected in the same manner.

Turning now to Fig. 2, the underlying principle of the gas analysis apparatus there shown is substantially the same as that of the apparatus shown in Fig. 1. However, in the embodiment of Fig. 2, two parallelly arranged reaction zone or chamber systems are provided which are connected to one another without the use of valves or cocks by means of a distributor pipe 33 connected to the outlet side of the preliminary measuring chamber 1 through the capillary tube on which the index mark 14 is provided.

The gas to be analyzed is led from the chamber 1 to the distributor pipe 33 and from the latter either to the system shown in the left half of Fig. 2 or to the substantially identical system shown in the right half of Fig. 2. As in Fig. 1, the gas sample is taken from a supply chamber 21 to a collecting chamber 23 and is led from there into the chamber 1 with valve 6 in chamber 1′ open. From the chamber 1 the gas can then flow to the right if the valve 34 is open or to the left if the valve 36 is open.

In the order to determine two components of the gas sample, two analyses are therefore carried out, the reaction chamber 2 being filled with an absorption solution or with a solid absorption agent designed to absorb one of the gas components, the chamber 4 being filled with another absorption agent or, alternatively, with a suitable reagent for absorbing or reacting with the other component of the gas. Especially worthy of note is the fact that even in this embodiment the flow path of the gas is not impeded by valves or cocks.

In general, it has been found that a complete gas analysis of the type described above can be carried out with the apparatus according to the present invention in approximately three to five minutes. This is a particular advantage over heretofore known gas analysis apparatus and procedures which have often proved to be uneconomical, both from the standpoint of the analyst and from the standpoint of the party requesting the analysis, because of the relatively excessive length of time involved in performing the analysis.

Of course it is also possible to construct the gas analysis apparatus in such a manner that instead of only two reaction chamber systems three or more such systems are provided, this necessitating only an equivalent number of connections to the distributing pipe 33, so that the gas sample may be led from the chamber 1 through the respective valveless capillary tubes into the various reaction chamber systems for analysis.

The distributor pipe 33, as well as the valves 34, 35, 36 and 37 which indirectly control the movement of the gas sample, make it possible to unite a number of analysis systems into a single unitary structural entity which may be mounted in a common temperature control jacket, whereby in all of the measuring and reaction stages the same pressure and temperature conditions obtain.

Insofar as solid absorption materials are employed in the analysis, these must be individually deposited in the various chambers. In that event, it is necessary to provide the absorption chambers with openings through which the absorption materials may be inserted or removed. For purposes of clarity and simplicity the covers or sealing means for these openings, such as ground glass stoppers, are not shown in the drawings.

It will, of course, be readily realized that the apparatus according to the present invention may be adapted for determining the components of different gas mixtures than the one described above. This only requires that the various chambers 2, 4 etc. be filled with reagents or other materials suited for reacting either physically or chemically with one or more of the components of the gas mixture being analyzed. For example, the presence of oxygen could be determined, in lieu of combustion, by absorption in a pyrogallol solution disposed in the absorption chamber 4.

When the analysis is intended to determine the percentages of both $O_2$ and $CO_2$, then the apparatus would be slightly modified by the provision of a first absorption chamber filled with pyrogallol solution to remove all $O_2$ from the gas mixture. The remainder of the gas mixture sample would then be transferred to the regular absorption chamber 4 filled with KOH where the $CO_2$ would be absorbed. $H_2$ is, of course, determined through combustion in the chamber 2.

The apparatus shown in Figs. 1 and 2 is essentially made of glass. The various valves 6 to 9 of the pressure equalizing chambers 1', 2', 3' and 4' consist of small valve cones made of suitable plastic materials which are supported by thin actuating rods. The latter are preferably made of small short wires.

The apparatus in toto is approximately 30 cm. long and equally as high. Thus, it requires a minimum of space which is a special advantage for laboratories performing gas analyses.

Thus, it will be seen that there has been provided, in accordance with the present invention, a method of analyzing gases comprising the steps of introducing a sample of said gases into a preliminary measuring zone, exerting pressure on a displacement liquid contacting said sample to cause said liquid to displace said sample from said preliminary measuring zone unidirectionally through a plurality of serially connected reaction zones containing reagents, the volume of a respective predetermined component of said sample being substantially changed in each of said reaction zones through interaction of said respective component with the corresponding reagent, whereby the volume of said sample is changed in each of said zones, and measuring the volume of said sample in each of said zones by measuring the quantity of said liquid required to move said sample past index marks provided with said zones, respectively, to thereby determine the amount of each of said components of said sample.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A gas analysis apparatus, comprising a preliminary measuring chamber, a plurality of reaction chambers, capillary tubes directly interconnecting said chambers in series and being provided with index marks, said tubes and some of said chambers being filled with a displacement liquid for contacting and displacing a gas sample through said tubes and chambers, the remaining chambers being filled with respective reagents, a plurality of pressure equalizing chambers provided with valves communicating, respectively, with said measuring and reaction chambers, a supply chamber for said displacement liquid communicating with said measuring chamber, and means operatively connected to said supply chamber for dispensing therefrom predetermined quantities of said liquid, whereby upon selective actuation of said last-named means and said valves said sample is displaced by said liquid through said tubes and said chambers for interaction with said reagents, respectively, the volume of said sample emerging sequentially from said chambers corresponding to the amount of said liquid required for displacing said sample past the respective index marks.

2. Apparatus according to claim 1, further including a distributor pipe having an inlet end connected to said measuring chamber and a plurality of outlet ends, one of said outlet ends being connected to one of said reaction chambers, and additional reaction chambers and capillary tubes interconnected in series with respect to each other and filled with reagents and said displacement liquid, the remainder of said outlet ends of said distributor pipe being connected to one of said additional reaction chambers, whereby a plurality of reaction chamber systems connected in parallel with each other is provided.

3. Apparatus according to claim 1, further comprising an isolating chamber provided with a bell in its interior, said isolating chamber being interconnected between two adjacent reaction chambers filled with different reagents, whereby intermingling of said different reagents is prevented.

4. Apparatus according to claim 1, said supply chamber comprising a pressure cylinder, said means comprising a piston reciprocally movable in said cylinder, said piston being provided with three sealing collars spaced axially from each other, the spaces between said collars being filled with lubricating material, and a high precision measuring instrument connected to said piston for indicating the movements thereof and the amount of said displacement liquid displaced by said piston.

5. Apparatus according to claim 1, said supply chamber comprising a vertically movable container substantially filled with said liquid, flexible conduit means connecting said container to said measuring chamber, and graduated means for indicating the elevational position of said container.

6. Apparatus according to claim 1, said pressure equalizing chambers being sealed from the atmosphere, and gaseous counterpressure means connected to said equalizing chambers, respectively, whereby the pressure on said gas sample within said chambers may be equalized with the pressure existing in said counterpressure means.

References Cited in the file of this patent

UNITED STATES PATENTS

| | | |
|---|---|---|
| 2,212,681 | Dunn | Aug. 27, 1940 |
| 2,389,706 | Williams et al. | Nov. 27, 1945 |
| 2,488,812 | Gaulston et al. | Nov. 22, 1949 |
| 2,600,158 | Clothier | June 10, 1952 |

FOREIGN PATENTS

| | | |
|---|---|---|
| 329,533 | France | June 3, 1903 |
| 366,935 | Germany | Jan. 13, 1923 |
| 13,554 | Australia | Aug. 2, 1934 |